(12) United States Patent
Burachas et al.

(10) Patent No.: US 10,909,401 B2
(45) Date of Patent: Feb. 2, 2021

(54) ATTENTION-BASED EXPLANATIONS FOR ARTIFICIAL INTELLIGENCE BEHAVIOR

(71) Applicant: SRI International, Menlo Park, CA (US)

(72) Inventors: Giedrius Burachas, Princeton, NJ (US); Arijit Ray, Princeton, NJ (US); Yi Yao, Princeton, NJ (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 16/422,649

(22) Filed: May 24, 2019

(65) Prior Publication Data

US 2019/0370587 A1 Dec. 5, 2019

Related U.S. Application Data

(60) Provisional application No. 62/677,518, filed on May 29, 2018.

(51) Int. Cl.
| | |
|---|---|
| *G06K 9/20* | (2006.01) |
| *G06N 20/00* | (2019.01) |
| *G06F 16/53* | (2019.01) |
| *G06T 11/20* | (2006.01) |

(Continued)

(52) U.S. Cl.
CPC ........... *G06K 9/2054* (2013.01); *G06F 16/53* (2019.01); *G06N 20/00* (2019.01); *G06T 7/11* (2017.01); *G06T 11/206* (2013.01); *G06T 11/60* (2013.01); *G06T 2207/20084* (2013.01)

(58) Field of Classification Search
CPC combination set(s) only.
See application file for complete search history.

(56) References Cited

U.S. PATENT DOCUMENTS 10,395,108 B1 * 8/2019 Geng ................. G06K 9/00449
10,515,125 B1 * 12/2019 Lavergne ................ G06F 16/93
(Continued)

OTHER PUBLICATIONS

"ML Practicum: Image Classification," Machine Learning Practica, retrieved from https://developers.google.com/machine-learning/practica/image-classification/convolutional-nerual-networks, on Apr. 17, 2019, 5 pp.

(Continued)

*Primary Examiner* — Wesner Sajous
(74) *Attorney, Agent, or Firm* — Shumaker & Sieffert, P.A.

(57) ABSTRACT

In general, the disclosure describes various aspects of techniques for attention-based explanations for artificial intelligence behavior. A device comprising a memory and a computation engine executing a processor may be configured to perform the techniques. The memory may store the artificial intelligence model and the image. The computation engine may receive a query regarding the image, and execute the artificial intelligence model to analyze the image in order to output the result to the query. The artificial intelligence model may, when analyzing the image to output the result, segment the image into hierarchically arranged semantic areas in which objects in the image are segmented into parts, determine, based on the query, an attention mask for the areas, update, based on the attention mask, the image to visually identify which of the areas formed a basis for the result, and output the updated image.

20 Claims, 7 Drawing Sheets

(51) Int. Cl.
*G06T 11/60* (2006.01)
*G06T 7/11* (2017.01)

(56) References Cited

U.S. PATENT DOCUMENTS

2016/0342895 A1* 11/2016 Gao .................. G06F 40/56
2018/0260668 A1* 9/2018 Shen ................ G06N 3/0454

OTHER PUBLICATIONS

Elvis, Deep Learning for NLP: An Overview of Recent Trends, medium.com, Aug. 23, 2018, 21 pp.
Young et al., "Recent Trends in Deep Learning Based Natural Language Processing," IEEE Computational Intelligence Magazine, vol. 13, No. 3, Aug. 2018, 32 pp.
Selvaraju et al., "Grad-CAM: Visual Explanations from Deep Networks via Gradient-based Localization," 2017 IEEE International Conference on Computer Vision (ICCV), Oct. 22-29, 2017, 24 pp.
Agrawal et al., "VQA: Visual Question Answering," www.visualqa.com, Oct. 27, 2016, 25 pp.
Krishna et al., "Visual Genome Connecting Language and Vision Using Crowdsourced Dense Image Annotations," International Journal of Computer Vision, Feb. 23, 2016, 44 pp.
"Visual Genome," retrieved from http://visualgenome.org, on May 21, 2019, 1 pp.

\* cited by examiner

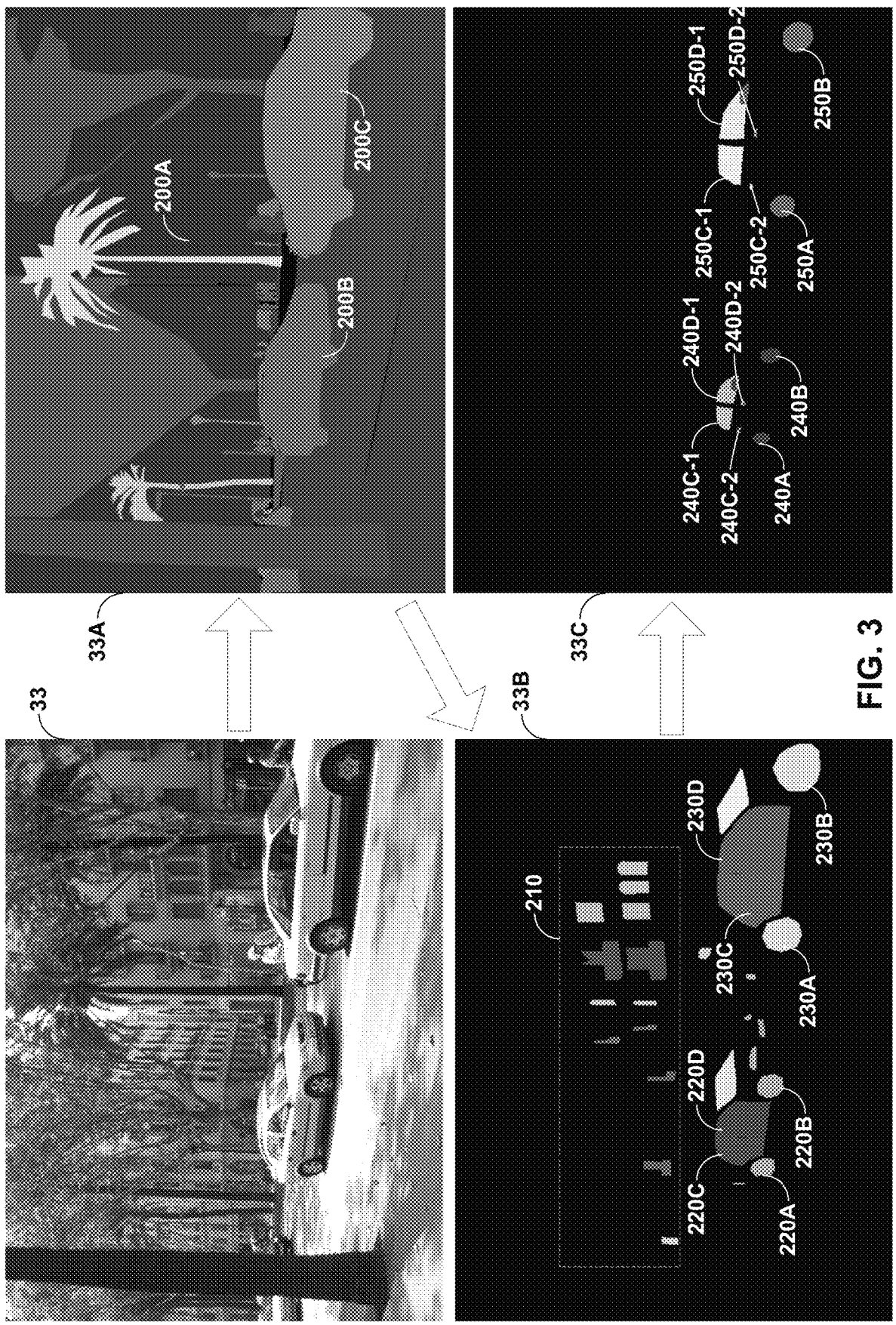

ATTENTION-BASED EXPLANATIONS FOR ARTIFICIAL INTELLIGENCE BEHAVIOR

This application claims the benefit of U.S. Provisional Application No. 62/677,518, filed May 29, 2018, the entire contents of which is hereby incorporated by reference.

GOVERNMENT RIGHTS

This invention was made with Government support under contract no. FA8750-17-C-0115 awarded by the Air Force Research Laboratory and the Defense Advanced Research Projects Agency. The Government has certain rights in this invention.

TECHNICAL FIELD

This disclosure is related to artificial intelligence.

BACKGROUND

Artificial intelligence (AI), in some instances, can be used as a way by which a computing device operates to predict an output either responsive to inputs or automatically generated, where simple logic is not sufficient. AI models may utilize machine learning (ML), which typically involves training an AI model with training data to produce a trained model able to generalize properties of data based on similar patterns with the training data. Training the model may involve learning model parameters by optimizing an objective function, thus optimizing a likelihood of observing the training data given the model. Given variabilities in the training data, the extent of training samples within the training data, and other limitations to training, and the complexity of modern AI models, it is often difficult to explain certain results that appear erratic or fail to meet expectations.

SUMMARY

In general, the disclosure describes various aspects of techniques for facilitating evaluation of results produced by artificial intelligence. More specifically, various aspects of the techniques described in this disclosure may enable attention-based explanations for artificial intelligence (AI) behavior (such as visual question answering [VQA] model behavior). Rather than simply providing an answer (in the example context of a VQA model), the VQA model may also identify which parts of an image were relied upon by the VQA model (i.e., the parts of the image toward which the "attention" of the VQA model was drawn) to reach the answer, thereby potentially providing an attention-based explanation that enables a user of the VQA model to evaluate a reason for the answer to assess confidence in the model or otherwise gain a better understanding of limitations of the VQA model.

In this respect, various aspects of the techniques may provide various benefits that improve operation of the VQA model. For example, by outputting the attention-based explanation along with the answer, the VQA model may better explain the answer to provide a more comprehensive and/or informative user experience that facilitates user trust and understanding of the VQA model. Further, by revealing limitations, the VQA model may delineate where further training may be useful to improve operation of the VQA model itself (where, in some instances, the VQA model may automatically perform unguided training responsive to user feedback indicating a given answer is unsupported by the attention-based explanation).

In one example, various aspects of the techniques are directed to a device configured to explain a result output by an artificial intelligence model configured to analyze an image, the device comprising: a memory configured to store the artificial intelligence model and the image; and a computation engine executing one or more processors, wherein the computation engine is configured to receive a query regarding the image, and wherein the computation engine is configured to execute the artificial intelligence model to analyze the image in order to output the result to the query, wherein the artificial intelligence model is configured to, when analyzing the image to output the result: segment the image into hierarchically arranged semantic areas in which one or more objects in the image are segmented into one or more parts; determine, based on the query, an attention mask for the hierarchically arranged semantic areas in which an attention score is assigned to one or more of each of the one or more objects and each of the one or more parts; update, based on the attention mask, the image to visually identify which of the hierarchically arranged semantic areas formed a basis for the result output by the artificial intelligence model; and output the updated image.

In another example, various aspects of the techniques are directed to a method of explaining a result output by an artificial intelligence model configured to analyze an image, the method comprising: receiving, by a computing device, a query regarding the image; and executing, by the computing device, the artificial intelligence model to analyze the image in order to output the result to the query, wherein analyzing, by the artificial intelligence model, the image to output the result: segmenting, by the computing device, the image into hierarchically arranged semantic areas in which one or more objects in the image are segmented into one or more parts; determining, based on the query and by the computing device, an attention mask for the hierarchically arranged semantic areas in which an attention score is assigned to one or more of each of the one or more objects and each of the one or more parts; updating, based on the attention mask and by the computing device, the image to visually identify which of the hierarchically arranged semantic areas formed a basis for the result output by the artificial intelligence model; and outputting, by the computing device, the updated image.

In another example, various aspects of the techniques are directed to a non-transitory computer-readable storage medium having stored thereon instructions that, when executed, cause one or more processors to: receive a query regarding the image; segment the image into hierarchically arranged semantic areas in which one or more objects in the image are segmented into one or more parts; determine, based on the query, an attention mask for the hierarchically arranged semantic areas in which an attention score is assigned to one or more of each of the one or more objects and each of the one or more parts; update, based on the attention mask, the image to visually identify which of the hierarchically arranged semantic areas formed a basis for the result output by the artificial intelligence model; and output the updated image.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

FIG. 3 is a diagram illustrating example operation of the scene-graph generation module shown in the example of FIG. 2 in performing various aspects of the evaluation techniques described in this disclosure.

Like reference characters refer to like elements throughout the figures and description.

DETAILED DESCRIPTION

Figure 1:
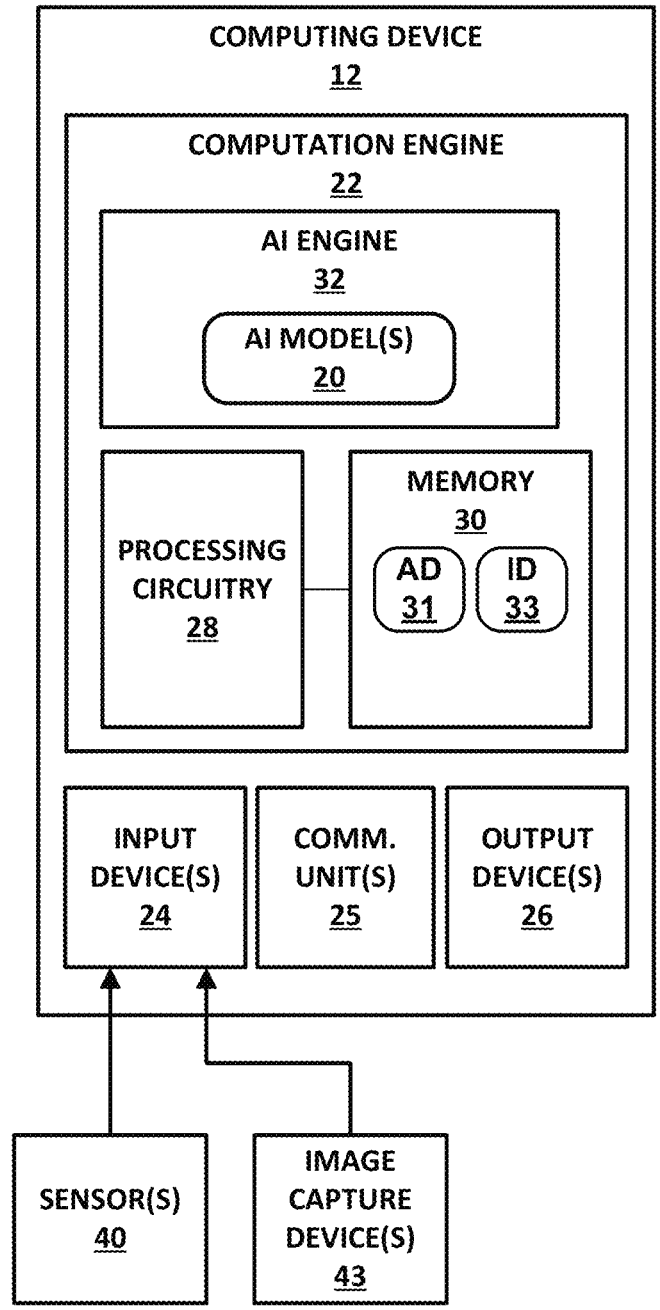
FIG. 1 is an example of a computing device that may be configured to perform various aspects of the explanation techniques described in this disclosure.

Machine learning may generally enable a computing device to analyze input data and identify an action to be performed or predict an output responsive to the input data (such as providing a given answer). Each machine learning model may be trained using training data that reflects likely input data. The training data may be labeled or unlabeled (meaning that the correct action to be taken based on a sample of training data is explicitly stated or not explicitly stated, respectively). The training of the machine learning model may be guided (in that a designer, such as a computer programmer may direct the training to guide the machine learning model to identify the correct action in view of the input data) or unguided (in that the machine learning model is not guided by a designer to identify the correct action in view of the input data). In some instances, the machine learning model is trained through a combination of labeled and unlabeled training data, a combination of guided and unguided training, or possibly combinations thereof.

Even when the machine learning model undergoes guided training with labeled training data (which may represent what might be considered the most directed training that should result in more expected actions compared to unguided training using unlabeled training data or various combinations thereof), there are limits to training the machine learning model as such training is not often exhaustive (in terms of fully sampling each feature of the space defined by the input data). In other words, there may be limited training data that may not fully address the wider variability of the input data.

Further, a potential benefit of machine learning models is to avoid exhaustive and time-consuming comprehensive training but still produce a machine learning model that performs accurate action (which is another way of referring to a "decision") identification through limited sampled training. As such, the resulting machine learning module may operate erratically (selecting surprising or unforeseen actions) in the context of certain (possibly unforeseen or unlikely) input data for which there were only limited (or no) samples in the training data or for which training was not fully performed.

Given the complexity of the machine learning model, it may be difficult to explain in detail a basis upon which the machine learning model identified the various results, particularly when such actions appear to be erratic or unexpected. To illustrate, consider an example of a machine learning model that implements a deep neural network, which may include three or more layers of neural networks, and which is trained using training data to identify an action. Attempting to explain how each neural network layer of the deep neural network weighed each aspect of the input data to identify what may be considered an erratic action may entail significant analysis and understanding of the training data, the input data, or combinations thereof.

As another example, consider a virtual question answering (VQA) model that includes one or more machine learning algorithms configured to support different aspects of the VQA model. Generally, the VQA model may receive as inputs an image and a query regarding the image (typically in the form of audio data representative of speech defining the query). The VQA model may include two different types of neural networks, a long-short term memory (LSTM) to process the audio data representative of the query to parse the query and identify keywords, and a convolutional neural network (CNN) to process the image and tag various portions of the image. The VQA model may process the keywords relative to the tags to identify an answer to the query. The complexity of the CNN (and to a lesser degree the LSTM) and how each layer of the CNN weights each portion of the image and applies corresponding tags may be considered an erratic action that may entail significant analysis and understanding of the training data, the input data (both the audio data and the image), or combinations thereof.

That is, machine learning-based systems (which is another way of referring to an artificial intelligence model) may be considered to largely operate as a black box with little visibility into causes for operational outcomes output by the machine learning-based systems (where such operational outcomes may refer to diagnostic/prognostic decision in data analytics, control decision in autonomous systems and other predictive inferences or, in other words, results produced by such machine learning-based systems). Consider a so-called black-box machine learning system deployed in a car parts factory for product quality assurance by way of visual camera inspection. In this example system, an engineer may encounter a problem of certain products on the assembly line being classified as defective. The block-box machine learning system may not, however, provide evidence used in such decision. Likewise, some of the analyzed parts may be classified as acceptable by the black-box machine learning system, even though an engineer notices suspicious features and would like to inspect decision making processes of the black-box machine learning system.

Various aspects of the techniques described in this disclosure facilitate the explanation of artificial intelligence that operate according to machine learning models. The techniques may enable a computing device to provide attention-based explanations for artificial intelligence behavior (such as visual question answering [VQA] behavior). Rather than simply provide an answer (in the example context of a VQA model), the VQA model may also identify which aspects of an underlying image were relied upon to reach the answer, thereby potentially providing an attention-based explanation that enables a user of the VQA model to evaluate a reason for the answer to assess confidence in the model or otherwise gain a better understanding of limitations of the VQA model.

In this respect, various aspects of the techniques may provide various benefits that improve operation of the VQA model itself. For example, by outputting the attention-based explanation along with the answer, the VQA model may better explain the answer to provide a more comprehensive user experience that facilitates user trust and understanding of the VQA model. Further, by revealing limitations, the VQA model may delineate where further training may be useful to improve operation of the VQA model itself (where, in some instances, the VQA model may automatically perform unguided training responsive to user feedback indicating a given answer is unsupported by the attention-based explanation).

In the car parts assembly example above, to provide a better context in which to assess the benefits, the various aspects of the techniques may provide an analytic explanation that potentially identifies features and/or components of the parts that form a basis for a fault operation outcome output by the black-box machine learning system. Another use scenario may involve a physician assistant tasked with running a machine learning system for diagnosing medical conditions of a patient vital organs based on medical imaging data, e.g., a magnetic resonance imaging (MM) image. The machine learning system may classify the image as normal, abnormal, and/or pathological. Counterintuitive or high-risk classification results would naturally cause a desire on the part of the user to understand the decision path that the system takes in order to produce the results.

FIG. 1 is an example of a computing device that may be configured to perform various aspects of the explanation techniques described in this disclosure. As shown in the example of FIG. 1, computing device 12 includes a computation engine 22, one or more input devices 24, one or more communication devices 25, and one or more output devices 26. Computation engine 22 may include processing circuitry 28 and a memory 30.

Memory 30 may store information for processing during operation of computation engine 22. In some examples, memory 30 may include temporary memories, meaning that a primary purpose of the one or more storage devices is not long-term storage. Memory 30 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Memory 30, in some examples, also include one or more computer-readable storage media (which may also be referred to as "non-transitory computer-readable media" or "non-transitory computer-readable storage media"). The computer-readable storage media may be configured to store larger amounts of information than volatile memory. The computer-readable storage media may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Whether representative of volatile or non-volatile memory, memory 30 may store program instructions and/or data associated with one or more of the modules, units, and/or engines described in accordance with one or more aspects of this disclosure.

Processing circuitry 28 and memory 30 may provide an operating environment or platform for computation engine 22, which may be implemented as software, but may in some examples include any combination of hardware, firmware, and software. Processing circuitry 28 may execute instructions and memory 30 may store instructions and/or data of one or more modules, units, and/or engines. The combination of processing circuitry 28 and memory 30 may retrieve, store, and/or execute the instructions and/or data of one or more applications, modules, units, engines, and/or software. Processing circuitry 28 and memory 30 may also be operably coupled to one or more other software and/or hardware components, including, but not limited to, one or more of the components illustrated in FIG. 1.

Computation engine 22 may perform operations described using software, hardware, firmware, or a mixture of hardware, software, and firmware residing in and/or executing at computing device 12. Computation engine 22 may execute each of the module(s), unit(s), and/or engine(s) with multiple processors or multiple devices. Computation engine 22 may execute one or more of such modules as a virtual machine or container executing on underlying hardware. One or more of such modules may execute as one or more services of an operating system or computing platform. One or more of such modules may execute as one or more executable programs at an application layer of a computing platform.

One or more input devices 24 of autonomous device 12 may generate, receive, or process input. Such input may include input from a keyboard, pointing device, voice responsive system, video camera (which may also function to capture still images), biometric detection/response system, button, sensor, mobile device, control pad, microphone, presence-sensitive screen, network, or any other type of device for detecting input from a human or machine.

One or more output devices 26 of computing device 12 may generate, transmit, or process output. Examples of output are tactile, audio, visual, and/or video output. Output devices 26 may include a display, sound card, video graphics adapter card, speaker, presence-sensitive screen, one or more USB interfaces, video and/or audio output interfaces, or any other type of device capable of generating tactile, audio, video, or other output. Output devices 26 may include a display device, which may function as an output device using technologies including liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output. In some examples, computing device 12 may include a presence-sensitive display that may serve as a user interface device that operates both as one or more input devices 24 and one or more output devices 26.

One or more communication units 25 of computing device 12 may communicate with devices external to computing device 12 (or among separate computing devices of computing device 12) by transmitting and/or receiving data, and may operate, in some respects, as both an input device and an output device. In some examples, communication units 25 may communicate with other devices over a network. In other examples, communication units 25 may send and/or receive radio signals on a radio network such as a cellular radio network. Examples of communication units 25 include a network interface card (e.g. such as an Ethernet card), an optical transceiver, a radio frequency transceiver, a GPS receiver, or any other type of device that can send and/or receive information. Other examples of communication units 25 may include Bluetooth®, GPS, 3G, 4G, and Wi-Fi® radios found in mobile devices as well as Universal Serial Bus (USB) controllers and the like.

As further shown in the example of FIG. 1, input devices 24 are configured to receive electrical signal input from one or more sensors, such as sensor(s) 40 and image capture device(s) 43 and convert the electrical signal input into a form usable by computing device 12. Sensors 40 may represent a wide variety of sensors configured to obtain data representative of an observational state of both a surrounding environment represented by computing device 12.

Sensors 40 may include, in some examples, one or more of a GPS sensor configured to obtain location state data indicative of a location of computing device 12, a gyroscope sensor configured to obtain orientation and velocity data indicative of an orientation and/or angular velocity of computing device 12, a proximity sensor configured to obtain proximity data indicative of a proximity of the computing device 12 to an object (such as a human), an accelerometer configured to obtain additional orientation data or other data indicative of an acceleration of the computing device 12 in a direction, a barometer configured to obtain relative pressure data indicative of the relative pressure in the environment, and/or a compass configured to obtain directional data indicative of a direction in which the computing device 12 is facing.

Sensors 40 may also include microphones or other transducers capable of detecting pressure waves representative of speech or other types of audio and outputting an electrical signal representative of the pressure waves (or changes thereof). Reference to microphones may include any type of microphone configured to obtain audio data, including bone-conducting microphones that sense vibrations in bone, flesh, or other materials.

Image capture device 43 may represent any type of device configured to capture image data representative of a scene. Image capture device 43 may sense light via an aperture and convert the detection of light into an electrical signal representative of color and luminance (and/or other representations of a color space). Image capture device 43 may include a camera capable of capturing one or more images, including a sequence of images that form video data.

As such, input devices 40 may include software or hardware configured to convert a received signal input from an analog signal from sensors 40 and/or image capture devices 43 to a digital signal for processing by computation engine 22. In another example, input devices 40 may include software or hardware configured to compress, decompress, transcode, encrypt, or decrypt a received signal from sensors 40 into a form usable by computing device 12. In another example, communication units 25 may represent a network interface device to receive packetized data or other data representative of signals generated by sensor(s) 40 or images generated by image capture device(s) 43.

As noted above, computation engine 22 is configured to execute AI engine 32 that operates according to one or more models, such as AI models 20. AI models 20 may include any number of different types of machine learning models, such as neural networks, deep neural networks, dense neural networks, and the like. Although described with respect to machine learning models, the techniques described in this disclosure are also applicable to other types of AI models, including rule-based models, finite state machines, and the like.

Machine learning may generally enable a computing device to analyze input data and identify an action to be performed or a result to be output responsive to the input data. Each machine learning model may be trained using training data that reflects likely input data. The training data may be labeled or unlabeled (meaning that the correct action to be taken based on a sample of training data is explicitly stated or not explicitly stated, respectively).

The training of the machine learning model may be guided (in that a designer, such as a computer programmer, may direct the training to guide the machine learning model to identify the correct action in view of the input data) or unguided (in that the machine learning model is not guided by a designer to identify the correct action in view of the input data). In some instances, the machine learning model is trained through a combination of labeled and unlabeled training data, a combination of guided and unguided training, or possibly combinations thereof. Examples of machine learning include nearest neighbor, naïve Bayes, decision trees, linear regression, support vector machines, neural networks, k-Means clustering, Q-learning, temporal difference, deep adversarial networks, evolutionary algorithms or other supervised, unsupervised, semi-supervised, or reinforcement learning algorithms to train one or more models.

Even when the machine learning model undergoes guided training with labeled training data (which may represent what might be considered the most directed training that should result in more expected actions compared to unguided training using unlabeled training data or various combinations thereof), there are limits to training the machine learning model as such training is not often exhaustive (in terms of fully sampling each feature of the space defined by the input data). In other words, there is limited training data that may not or may not fully address the wider variability of the input data. Further, a potential benefit of machine learning models is to avoid exhaustive and time-consuming comprehensive training but still produce a machine learning model that performs accurate action (which is another way of referring to a "decision") identification through limited sampled training. As such, resulting AI models 20 may operate erratically (selecting surprising or unforeseen actions) in the context of certain (possibly unforeseen or unlikely) input data for which there were only limited (or no) samples in the training data or for which training was not fully performed.

Given the complexity of AI model 20, it may be difficult to explain in detail a basis upon which AI model 20 identified the various actions, particularly when such actions appear to be erratic or unexpected. To illustrate, consider an example of AI model 20 that implements a neural network, which may include multiple layers of neural networks, each of which is trained using training data to identify an action. Attempting to explain how each neural network of the neural network weighed each aspect of the input data to identify what may be considered an erratic action may entail significant analysis and understanding of the training data, the input data, or combinations thereof.

Attempting to explain any machine learning models may be difficult, but combinations of machine learning models acting with respect to images, sequences of images (e.g., videos), or other visual data depicting a scene may further complicate a process used to explain a result returned by the combinations of machine learning models. For example, consider a visual question answering (VQA) model that includes one or more machine learning algorithms configured to return an answer to a query regarding an underlying image. The VQA model may receive as inputs the underlying image and a query regarding the image (typically in the form of audio data representative of speech defining the query). The VQA model may include two different types of neural networks, a long-short term memory (LSTM) to process the audio data representative of the query to parse the query and identify keywords, and a convolutional neural network (CNN) to process the image and tag various portions of the image. The VQA model may process the keywords relative to the tags to identify the answer to the query. The complexity of the CNN (and to a lesser degree the LSTM) and how each layer of the CNN weights each portion of the image and applies corresponding tags may be considered an erratic action that may entail significant analysis and understanding of the training data, the input data (both the audio data and the image), or combinations thereof.

In accordance with various aspects of the techniques described in this disclosure, AI models 20 may be configured to provide attention-based explanations for artificial intelligence behavior (such as visual question answering [VQA] behavior). Rather than simply provide an answer (in the example context of a VQA model), AI model 20 may also identify which aspects of an underlying image were relied upon to reach the answer, thereby potentially providing an attention-based explanation that enables a user of AI model 20 to evaluate a reason for the answer to assess confidence in AI model 20 or otherwise gain a better understanding of limitations of AI model 20.

In the below example, it is assumed that AI model 20 is a collection of AI models configured to perform VQA. This collection of AI models may be referred to as a VQA model and as such, AI model 20 may be referred to in this disclosure as "VQA model 20." Although described with respect to a VQA, the techniques of this disclosure may be implemented with respect to any visual analysis of images by machine learning models to potentially improve confidence in the underlying AI models (such as machine learning models and other non-machine learning models, including the non-machine learning models listed above) or better delineate limitations of the AI models.

In operation, VQA model 20 may obtain image data (ID) 31 representative of an image and audio data (AD) 33 representative of a query. Input devices 24 may initially interact with sensor 40 (e.g., a microphone) to obtain AD 31 and image capture device 43 (e.g., a camera) to obtain ID 33. Input device 24 may store AD 31 and ID 33 to memory 30, whereupon VQA model 20 may obtain the AD 31 and ID 33 from memory 30.

In some instances, the user may interface with input device 24 directly (via a graphical keyboard) or other non-audio interface to directly provide the query. AD 31 may therefore in some instances be any data representative of a query, such as a text query. However, for purposes of illustration it is assumed that the user entered the query as speech through voice-related interaction with computing device 12. Although not shown in the example of FIG. 2, AD 31 may undergo processing to convert AD 31 to text prior to processing by VQA model 20.

Moreover, computing device 12 may obtain ID 33 in a variety of different ways other than via image capture device 43. For example, computing device 12 may interface with memory 30 to retrieve a previously captured image (via image capture device 43 or via a different image capture device associated with a different device). Computing device 12 may, in some examples, interface with communication unit 25 to retrieve ID 33 from a network storage location (e.g., the Internet) or other repository of image data.

In addition, ID 33 is discussed as an example representative of any type of image, including sequences of images (such as video data), medical scans (which may be constructed based on other type of sensor readings—such as radiological sensors), light detection and ranging (LIDAR) data, or any other type of data capable of being depicted in two-dimensional arrays, three-dimensional arrays and the like. As such, while described with respect to ID 33 being a single image, the techniques may be performed with respect to other types of ID 33, not all of which are visual images.

In any event, VQA model 20 may receive AD 31 representative of the query regarding ID 33. VQA model 20 may execute one or more AI models to analyze ID 33 in order to output the result to the query represented by AD 31. More information regarding VQA can be found in a paper by Agrawal, Aishwarya, et al., entitled "VQA: Visual Question Answering," dated 27 Oct. 2016.

In some examples, VQA model 20 may invoke a long-short term memory (LSTM) neural network (which may be denoted as "LSTM") to parse the query represented by AD 31 to identify one or more keywords and relationships between the keywords. VQA model 20 may also invoke a convolutional neural network (CNN) to tag portions of ID 33 and process the tagged portions of ID 33 to correlate the keywords with the tags assigned to each of the tagged portions of ID 33 in order to identify the result (which may be another way to refer to the answer to the query).

However, rather than only output an answer or other result to the query specified in AD 31, VQA model 20 may be configured to, when analyzing ID 33 to output the result, segment the image represented by ID 33 into hierarchically arranged areas in which one or more objects in the image are segmented into one or more parts. To illustrate briefly (as more detail is provided below), VQA model 20 may identify a person, creating a first level in the area hierarchy labeled, as an example, as "person." VQA model 20 may construct the area hierarchy using a graph data structure (formed of one or more tree data structures) having one or more root nodes, which in this example includes the area of the image including the person and the "person" label.

VQA model 20 may next segment the area of the image including the person into respective parts, such as a "shirt" area that includes the shirt worn by the person, a "head" area that includes the head of the person, a "pant" or "short" area that includes the pants or shorts of the person, and any other semantically relevant area of the person area (which is another way of referring to the area including the person). In some examples, the segmentation may proceed recursively whereupon VQA model 20 may invoke the segmentation algorithm with respective to each segmented area to further segment the area and so on until an end segmentation is reached.

Segmentation may refer to any type of semantic segmentation in which individual pixels are assigned to objects by their class. Semantic segmentation may include processing frames and/or images to generate a plurality of semantically segmented sub-views of frames and/or images. For example, to generate the plurality of semantically segmented sub-views, semantic segmentation may classify one or more pixels in each of the frames as belonging to one or more objects. Each object includes an object type that corresponds to one of the semantically segmented sub-views. Semantic segmentation may apply, to each of the classified one or more pixels in each of the frames and/or images, a label corresponding to the object type. For example, the set of semantic classification labels to which pixels may be semantically labeled may include: Sky, Building, Pole, Road Marking, Road, Pavement, Tree, Sign Symbol, Fence, Vehicle, Pedestrian, and Bicycle. Thus, each semantically-segmented sub-view may contain only those pixels that are labeled with a particular class. For example, a first semantically segmented sub-view of a frame may include each pixel labeled with a "Sky" classification label, while a second semantically segmented sub-view of a frame may include each pixel labeled with a "Road" classification label, etc.

VQA model 20 may update the tree data structure to create a link (or, in other words, edge) between the root node and each sub-area segmented from the area including the person, creating child nodes for each sub-area including the shirt, head, pant or short, and any other semantically relevant area of the area including the person, and specifying in each child node the corresponding label of "shirt," "head," "short" or "pant," etc. VQA model 20 may label each edge with a relationship between the root node and the child node. For example, VQA model 20 may label the edge between the root "person" node and the child "shirt" node as "on," as the person has the shirt "on" and not "off." VQA model 20 may proceed in this manner to segment the sub-areas when possible into further semantically relevant sub-areas, updating the tree data structure with the relationship to the previous sub-area, the sub-area (or an identification of the sub-area, e.g., via pixel coordinates for a bounding box or other geometry), and the label.

After segmenting the image represented by ID 33, VQA model 20 may determine, based on the query represented by AD 31 (and, in some examples, keywords parsed from the query represented by AD 31), an attention mask for the hierarchically arranged semantic areas in which an attention score is assigned to one or more of each of the one or more objects and each of the one or more parts. VQA model 20 may generate the attention mask as a heatmap with different colors identifying different levels of attention corresponding to the different attention scores (e.g., no color identifying a lack of any attention, a color green identifying low attention, a color red identifying relatively high attention and various colors in between red and green identifying intermediate attention between the low attention green and the high attention red, etc.).

VQA model 20 may then update, based on the attention mask, the image represented by ID 33 to visually identify which of the hierarchically arranged areas formed a basis for the result (e.g., the answer in the context of VQA) output by VQA model 20. That is, VQA model 20 may overlay the heatmap on the image represented by ID 33 to produce a visual indication of attention (e.g., in the form of different colors between no color and red), thereby obtaining an updated image that includes the heatmap and the underlying image represented by ID 33. VQA model 20 may output the result along with the updated image that provides a visual explanation of the result.

In this respect, various aspects of the techniques may provide various benefits that improve operation of VQA model 20 itself. For example, by outputting the attention-based explanation (e.g., the update image) along with the answer, VQA model 20 may better explain the answer to provide a more comprehensive user experience that facilitates user trust and understanding. Further, by revealing limitations (e.g., when the explanation provided by the updated image does not match the answer or explains that faulty attention was focused on incorrect areas of the image to produce the answer), VQA model 20 may delineate where further training may be useful to improve operation of VQA model 20 itself (where, in some instances, VAQ model 20 may automatically perform unguided training responsive to user feedback indicating a given answer is unsupported by the attention-based explanation).

Figure 2:
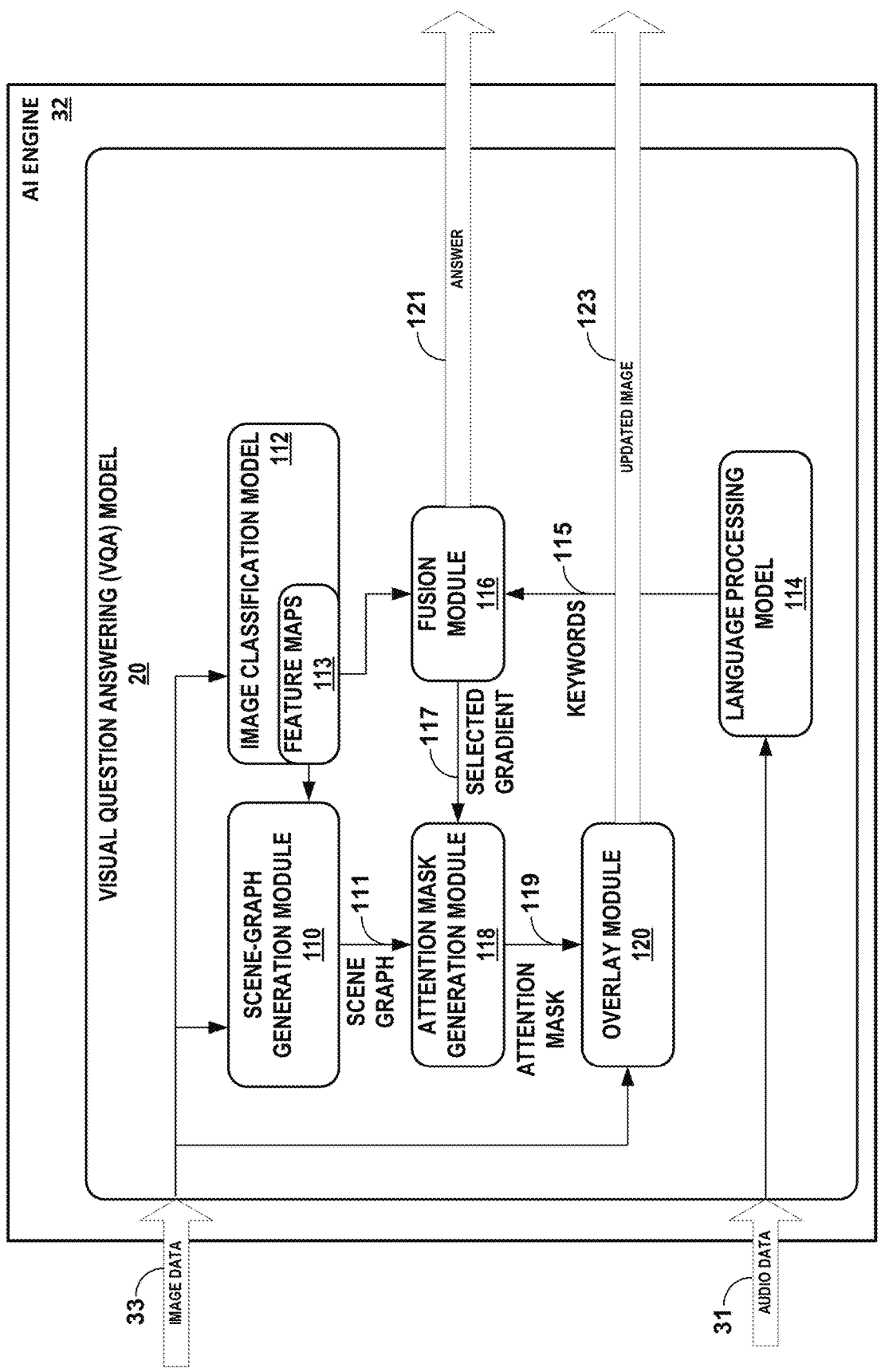
FIG. 2 is a block diagram illustrating an example of the artificial intelligence engine of FIG. 1 in more detail.

FIG. 2 is a block diagram illustrating an example of the artificial intelligence engine of FIG. 1 in more detail. As shown in the example of FIG. 2, artificial intelligence (AI) engine 32 may execute a visual question answering (VQA) model 20. VQA model 20 may include a scene-graph generation module 110, an image classification model 112, a language processing model 114, a fusion module 116, an attention mask generation module 118, and an overlay module 120.

VAQ model 20 may first obtain audio data 31 and image data 33. Responsive to obtaining image data 33, VQA model 20 may invoke scene-graph generation module 110. Scene-graph generation module 110 may represent a module configured to generate the graph data structure 111 discussed briefly above and in more detail below. As graph data structure 111 may semantically represent a scene depicted by the image specified by image data 33, graph data structure 111 may be referred to as a "scene graph 111."

In any event, scene-graph generation module 110 may recursively segment the image (represented by image data 33) into areas, sub-areas of areas, and sub-areas of sub-areas, etc. to obtain hierarchically arranged semantic areas in which one or more objects in the mage are segmented into one or more parts. As scene-graph generation module 110 may operate recursively, scene-graph generation module 110 may segment the one or more parts into one or more sub-parts, etc.

Scene-graph generation module 110, when segmenting the image into objects, parts, sub-parts, etc., may construct scene graph 111 to include a root node for each object, a child node, for each part, linked (via an edge) to a corresponding root node, another child node, for each sub-part, linked (via another edge) to a corresponding part for each sub-part, and so on. Scene-graph generation module 110 may identify the one or more objects, parts, sub-parts, etc. at a pixel-level of granularity (meaning, for example, that each pixel representative of an object, a part, a sub-part, etc. is individually associated with the object, part, sub-part, etc.). As such, scene-graph generation module 110 may segment the one or more objects into one or more parts at the pixel-level of granularity.

Scene-graph generation module 110 may specify each node (e.g., root node, child node, and leaf node—which refers to a node with no linked children nodes) of scene graph 111 to define the object, part, sub-part, etc. at a pixel-level of granularity, a bounding box outlining the object, part, sub-part, etc. to highlight a general location of each object, part, sub-part, etc., and/or one or more attributes associated with the object, part, sub-part, etc. (such as a color, a shape, a label—which may also be referred to as a tag or feature). Scene-graph generation module 110 may also specify each edge connecting the nodes to include a relationship between the parent node and the child node. In the example shown in FIG. 2, scene-graph generation module 110 may also specify metadata for scene graph 111 that identifies one or more scenes shown in the image represented by image data 33.

In the case of temporally varying data (such as video data, medical scans—including three dimensional medical scans that vary over time, which are defined via four dimensional hypercubes, and the like), scene-graph generation module 110 may generate the scene-graph as a spatio-temporal scene graph, where the spatio-temporal scene graph includes one or more scene graphs for each instance in time. The spatio-temporal scene graph may identify actions (e.g., feature action recognition), where such actions may identify relationships between different nodes and/or edges between difference nodes and/or edges of scene graph that span different times.

As such, high dimensional data may be referred to as images, where images are partial projections of higher dimensional data. Some data may require transformation (such as magnetic resonance imaging—MRI—data, which is converted from a Fourier space to an image space), while some AI algorithms may be applied to the data before it is converted or otherwise transformed to image data. In this respect, various aspects of the techniques should not be limited solely to image data 33 but may be applied to any type of data from which image data 33 may be extracted or otherwise obtained.

Responsive to receiving image data 33, VQA model 20 may also invoke image classification model 112. Image classification model 112 may represent a neural network, such as the above noted convolutional neural network (CNN), configured to perform image classification with respect to the image represented by image data 33. Image classification model 112 may represent a trained CNN configured to identify the objects, parts, sub-parts, etc., the attributes, and the metadata used to construct scene graph 111.

Image classification model 112 may obtain, for each scene, object, part, sub-part, etc. a feature map, where the collection of feature maps are shown in the example of FIG. 2 as feature maps 113. Each feature map of feature maps 113 may identify a location of the corresponding scene, object, part, sub-part, etc. (such as the center of each scene, object, part, sub-part, etc. or a pixel-level of granularity for each scene, object, part, sub-part, etc.). As such, image classification model 112 may represent a model configured to encode image data 33 into feature maps 113. Image classification model 112 may output feature maps 113 to scene-graph generation model 110 and fusion model 116.

Scene-graph generation module 110 may define, based on feature maps 113, the nodes to include the scene metadata, the attributes, and the like, where scene-graph generation model 110 may associate each feature map of feature maps 113 to the corresponding node based on the location associated with each feature map of features maps 113 to the location identified by the nodes. Scene-graph generation module 110 may output scene graph 111 to attention mask generation module 118.

VQA model 20 may also, responsive to obtaining audio data 31, invoke language processing model 114. Language processing model 114 may represent any model capable of processing natural language, e.g., speech represented audio data 31 or other types of natural language, including text, glyphs (such as icons, emoticons, etc.) and the like, to obtain keywords 115 (which refer to semantically relevant words representative of a question). As such, language processing model 114 may represent a module configured to encode audio data 31 into keywords 115. Language processing model 114 may include a long-short term memory (LSTM) configured to process audio data 31 to extract or otherwise parse keywords 115, and thereby identify a meaning of the query. More information regarding natural language processing (NLP) can be found in a paper by Young, Tom, et al., entitled "Recent Trends in Deep Learning Based Natural Language Processing," dated 25 Nov. 2018. Language processing model 114 may output keywords 115 to fusion model 116.

VQA model 20 may next invoke fusion module 116, which may represent a module configured to project keywords 115 onto a feature space defined through image training of image classification model 112, thereby fusing the question to the feature space. Fusion module 116 may similarly project each feature map (which may be represented as a vector of one or more features, and as such be referred to as a "feature vector") of feature maps 113 onto the feature space.

Fusion module 116 may, after projecting each feature map of feature maps 113 and keywords 115 onto the feature space, identify a gradient (which may refer to a multi-dimensional distance) between each point in the feature space representative of one or more of keywords 115 and each point in the feature space representative of each feature map of feature maps 113. Fusion module 116 may be trained to recognize likely answers to the query represented by audio data 31 as computed gradients within a threshold gradient of the point in the feature space representative of the one or more keywords 115. Fusion module 116 may select the smallest gradient within the threshold distance as a selected gradient 117. In this respect, fusion module 116 may effectively analyze, based on keywords 115 representative of the meaning of the query identified by audio data 31, the hierarchically arranged semantic areas to obtain the result (i.e., the selected gradient 117 in this example) to the query. Fusion module 116 may output selected gradient 117 to attention mask generation module 118.

Fusion module 116 may also generate, based on selected gradient 117, answer 121. More information regarding how fusion module 116 may generate answer 121 based on selected gradient 117 can be found in a paper by Selvaraju, Ramprasaath, et al., entitled "Grad-CAM: Visual Explanations from Deep Networks via Gradient-based Localization," dated 21 Mar. 2017. VQA model 20 may output answer 121 to the query represented by audio data 31 along with an updated image 123, which is prepared as described in more detail below.

VQA model 20 may, responsive to determining selected gradient 117, invoke attention mask generation module 118. Attention mask generation module 118 may represent a module configured to obtain, based on scene graph 111 and selected gradient 117, an attention mask 119. Attention mask generation module 118 may associate selected gradient 117 with scene graph 111, assigning, based on selected gradient 117, attention scores to each scene, object, part, sub-part, etc. In this respect, attention mask generation module 118 may obtain, based on selected gradient 117, attention scores for the identified one or more hierarchically arranged semantic areas defined by scene graph 111.

Attention mask generation module 118 may associate the attention scores with various nodes in scene graph 111 to transform scene graph 111 into attention mask 119, thereby obtaining attention mask 119. More information regarding the generation of attention mask 119 can be found in a paper by Selvaraju, Ramprasaath, et al., entitled "Grad-CAM: Visual Explanations from Deep Networks via Gradient-based Localization," dated 21 Mar. 2017. Attention mask generation module 118 may output attention mask 119 to overlay module 120.

VQA model 20 may next invoke, responsive to obtaining attention mask 119, overlay module 120. Overlay module 120 may represent a unit configured to transform attention mask 119 into a visual heatmap that uses color to visually identify which of the hierarchically arranged semantic areas formed a basis for the result output by VQA model 20. Overlay module 120 may prepare the heatmap in a manner similar to the above referenced paper by Selvaraju, Ramprasaath, et al., entitled "Grad-CAM: Visual Explanations from Deep Networks via Gradient-based Localization," dated 21 Mar. 2017. However, rather than prepare a general heatmap unspecific to selected object, part, sub-part, etc. pixel-level boundaries or even hierarchically arranged areas, overlay module 120 may prepare a pixel-specific heatmap constrained to hierarchically arranged areas and/or individual objects, parts, sub-parts, etc. Overlay module 120 may assign colors based on the attention scores defined by attention mask 119 to obtain the heatmap. Overlay module 120 may then overlay the heatmap on the image represented by image data 33 to obtain updated image 123. VQA model 20 may output update image 123 for visual inspection by the user along with answer 121.

In this way, VQA model 20 may be adapted to enable transparent observation of the evidence used and the impact of an inference stage on results at subsequent inference stages and thereby potentially mitigate the lack of operational transparency of VQA model 20. By adopting a hierarchical, semantically interpretable architecture and a learning algorithm that induces attention weights a multiple levels of the hierarchically arranged semantic areas for inspecting causal flow of inference. The hierarchical stages analyze content of the images (or videos) and identify semantic areas (or, in other words, regions), such as sub-parts, parts, objects, attributes, and relationships between object pairs and entire scene types (and also potentially elementary actions and complex actions for video).

Segmentation masks (in the form of scene graph 111) of these semantic areas may then be weighted by attention weights trained using stochastic gradient descent and may then be visualized by superimposing on the image (or other annotation process, such as a ranked table of semantic areas by significance, output of the attention weights themselves, etc.). As such, each semantic area (except those areas potentially belonging to the lowest, non-divisible level) is partitioned into key semantically meaningful sub-regions with weights visualized/displayed, so that a user can readily inspect contributions of the sub-regions to the inference at the level of interest.

Moreover, pixel-level specific heatmaps assigned to various hierarchical arranged areas may provide a number of benefits in various contexts. For example, robotic assembly lines that use AI analysis models for visual (and by means of other sensors) inspects of products may benefit from pixel-level specific heatmaps to enable users overseeing the assembly lines to better assess the AI analysis models decisions regarding, as one example, quality control (as identification of quality issues may require pixel-level granularity to identify, e.g., hair line fractures in products). Similarly, AI analysis models for medical diagnostic systems (e.g., for radiology) may also require pixel-level granularities to identify small bone fractures, cancers, etc. Likewise, other AI analysis models directed to video surveillance, video archiving systems, satellite imagery systems, and analysis of social media data may benefit from increasingly lower-levels of granularity to properly build confidence in inferences made by the AI models.

FIG. 3 is a diagram illustrating example operation of the scene-graph generation module shown in the example of FIG. 2 in performing various aspects of the evaluation techniques described in this disclosure. In the example of FIG. 3, scene-graph generation module 110 may obtain image 33, and recursively segment image 33 into example hierarchically arranged areas 200A-200C (where only a non-zero subset of the hierarchically arranged areas are denoted with reference numerals for ease of explanation) of segmented image 33A.

Segmented image 33A represents an output of a first segmentation stage of the recursive segmentation algorithm executed by scene-graph generation module 110. Hierarchically arranged areas 200A-220C may each represent a root node of scene graph 111, where hierarchically arranged area 200A represents background buildings, hierarchically arranged area 200B represents a first vehicle, and hierarchically arranged area 200C represents a second vehicle.

For each hierarchically arranged area 200A-200C, scene-graph generation module 110 again executes (as the algorithm is recursive) the segmentation algorithm to individually segment each of the hierarchically arranged areas 200A-200C producing hierarchically arranged sub-areas 210 for hierarchically arranged area 200A, hierarchically arranged sub-areas 220A-220D for hierarchically arranged area 200B, and hierarchically arranged sub-areas 230A-230D for hierarchically arranged area 200C, as shown in segmented image 33B. Segmented image 33B represents an output of a second segmentation stage of the recursive algorithm executed by scene-graph generation module 110.

Scene-graph generation module 110 may define a child node (for each element shown within the dashed lined box of segmented image 33B) linked via an edge to the root node representative of hierarchically arranged area 200A. Scene-graph generation module 110 may execute the recursive segmentation algorithm with respect to each element shown within the dashed lined box denoted 210, which determines that no further segmentation is possible, leaving each of the child nodes as leaf nodes having no further children nodes (as shown by the lack of any further elements in hierarchically arranged sub-area 210 shown in the example of segmented image 33C).

Scene-graph generation module 110 may also define a child node for each of hierarchically arranged sub-areas 220A-220D (including those not enumerated using reference numerals, which have been omitted for ease of explanation), linking the child nodes representative of hierarchically arranged sub-areas 220A-220D to the parent node within scene graph 111 representative of hierarchically arranged area 200B. Scene-graph generation module 110 may execute the recursive segmentation algorithm with respect to each of hierarchically arranged sub-areas 220A-220D, which determines that further segmentation is possible, and identifies hierarchically arranged sub-area 240A for hierarchically arranged sub-area 220A, hierarchically arranged sub-area 240B for hierarchically arranged sub-area 220B, hierarchically arranged sub-areas 240C-1 and 240C-2 for hierarchically arranged sub-area 220C, and hierarchically arranged sub-areas 240D-1 and 240D-2 for hierarchically arranged sub-area 220D, as shown in the example of segmented image 33C, which represents an example of a third segmentation stage.

Scene-graph generation module 110 may also define a child node for each of hierarchically arranged sub-areas 230A-230D (including those not enumerated using reference numerals, which have been omitted for ease of explanation), linking the child nodes representative of hierarchically arranged sub-areas 230A-230D to the parent node within scene graph 111 representative of hierarchically arranged area 200C. Scene-graph generation module 110 may execute the recursive segmentation algorithm with respect to each of hierarchically arranged sub-areas 230A-

230D, which determines that further segmentation is possible, and identifies hierarchically arranged sub-area 250A for hierarchically arranged sub-area 230A, hierarchically arranged sub-area 250B for hierarchically arranged sub-area 230B, hierarchically arranged sub-areas 250C-1 and 250C-2 for hierarchically arranged sub-area 230C, and hierarchically arranged sub-areas 250D-1 and 250D-2 for hierarchically arranged sub-area 230D, as shown in the example of segmented image 33C, which again represents an example of a third segmentation stage.

Scene-graph generation module 110 may define further child nodes for each hierarchically arranged sub-areas 240A-240D-2, linking the child nodes representative of hierarchically arranged sub-areas 240A-240D-2 to the respective parent node within scene graph 111 representative of hierarchically arranged sub-areas 220A-220D. Scene-graph generation module 110 may also define further child nodes for each hierarchically arranged sub-areas 250A-250D-2, linking the child nodes representative of hierarchically arranged sub-areas 250A-250D-2 to the respective parent node within scene graph 111 representative of hierarchically arranged sub-areas 230A-230D. Based on features maps 113, scene-graph generation module 110 may further specify the relationships, attributes and general scene metadata to produce scene graph 111.

Figures 4A, 4B:
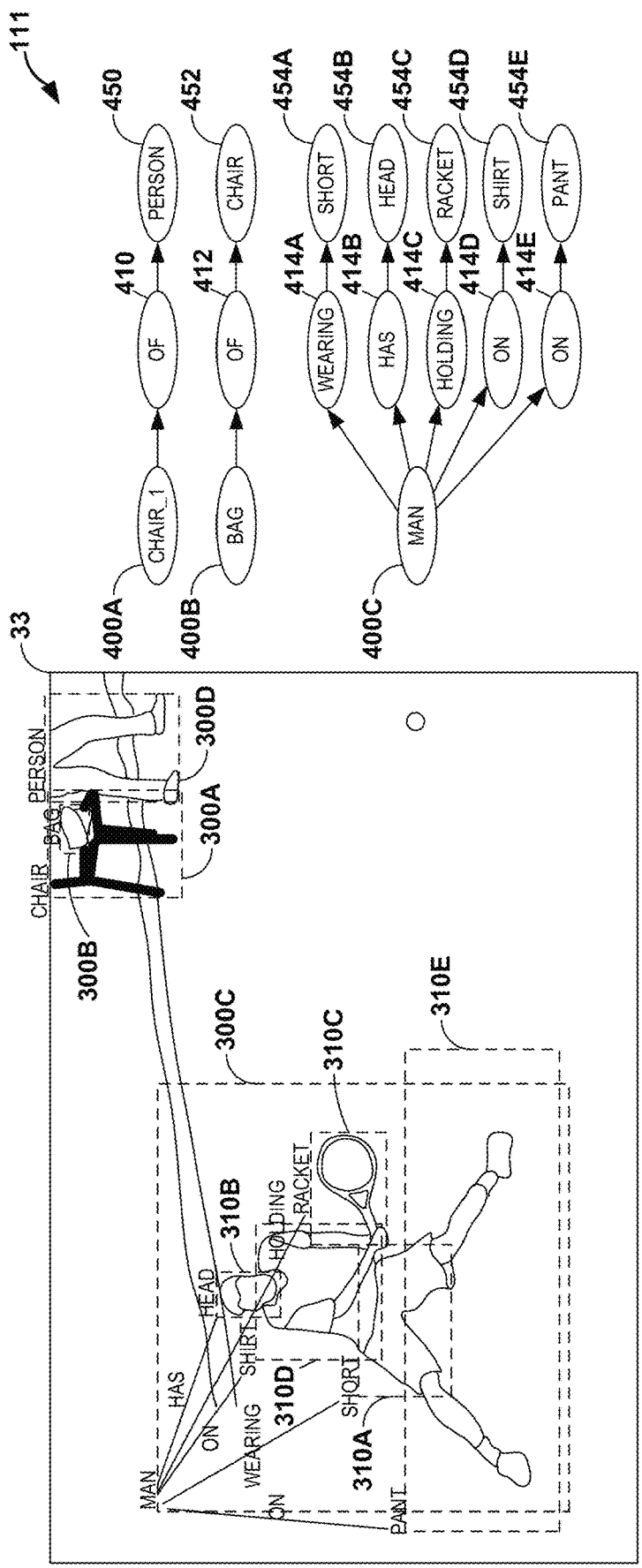
FIGS. 4A and 4B are diagrams illustrating example operation of the scene-graph generation module shown in the example of FIG. 2 in more detail.

FIGS. 4A and 4B are diagrams illustrating example operation of the scene-graph generation module shown in the example of FIG. 2 in more detail. In the example of FIG. 4A, scene-graph generation module 110 obtains image data 33 representative of a scene in which a man is playing tennis. Scene-graph generation module 110 may recursively segment the image represented by image data 33 into three distinct hierarchically arranged areas 300A-300C. Hierarchically arranged area 300A identifies a chair, labeled "chair_1." Hierarchically arranged area 300B identifies a bag, labeled "bag." Hierarchically arranged area 300C identifies a man, labeled "man." Hierarchically arranged area 300D identifies a person, labeled "person."

As shown in the example of FIG. 4B, scene-graph generation module 110 may define root nodes 400A-400C corresponding to hierarchically arranged areas 300A-300C. Scene-graph generation module 110 may also identify another hierarchically arranged area 300D labeled as "person", but not create a root node after assessing relationships between each of the remaining hierarchically arranged areas 300A-300C. That is, for each hierarchically arranged areas 300A-300D, scene-graph generation module 110 may analyze each hierarchically arranged area of hierarchically arranged areas 300A-300D relative to the remaining hierarchically arranged areas of hierarchically arranged areas 300A-300D to determine whether each respective one of hierarchically arranged areas 300A-300D are to be defined as root nodes in scene graph 111.

In the example of FIGS. 4A and 4B, scene-graph generation module 110 determines that hierarchically arranged area 300D is dependent from (possibly as a result of training) hierarchically arranged area 300B. As such, scene-graph generation module 110 associates, via relationship edge 410, root node 400A representative of hierarchically arranged area 300A to child node 450 representative of hierarchically arranged area 300D. Furthermore, scene-graph generation module 110 may create root node 400A representative of hierarchically arranged area 300A, while also creating a child node 452 representative of hierarchically arranged area 300A as being linked, via relationship edge 412, to root node 400B representative of hierarchically arranged area 300B. In both instances, relationship edge 410 and 412 define a relationship of being "OF" the corresponding root node 400A and 400B, which is indicative of possession.

Returning back to the example of FIG. 4A, scene-graph generation module 110 may recursively segment each of hierarchically arranged areas 300A-300D, determining that hierarchically arranged areas 300A, 300B, and 300D have no parts that meet a learned threshold for further segmentation. With respect to hierarchically arranged area 300C, scene-graph generation module 110 identifies five different hierarchically arranged sub-areas 310A-310E. Hierarchically arranged sub-area 310A identifies shorts worn by the man and is labeled "short." Hierarchically arranged sub-area 310B identifies a head of the man and is labeled "head." Hierarchically arranged sub-area 310C identifies a racket held by the man and is labeled "racket." Hierarchically arranged sub-area 310D identifies a shirt on the man and is labeled "shirt." Hierarchically arranged sub-area 310E identifies pants on the man and is labeled "pant."

Scene-graph generation module 110 may, referring again to the example of FIG. 4B, define child nodes 454A-454E for each corresponding one of hierarchically arranged sub-areas 310A-310E, associating each of child nodes 454A-454E representative of corresponding hierarchically arranged sub-areas 310A-310E to root node 400C representative of hierarchically arranged area 300C via relationship edges 414A-414E. Scene-graph generation module 110 may identify a relationship of "wearing" for relationship edge 414A, a relationship of "has" for relationship edge 414B, a relationship of "holding" for relationship edge 414C, a relationship of "on" for relationship edge 414D, and a relationship of "on" for relationship edge 414E.

Although not shown in the example of FIG. 4B, scene-graph generation module 110 may define scene metadata for scene graph 111 as well as attributes or other data or metadata reflective of various aspects of the image represented by image data 33. The omission of scene metadata, attributes and other aspects of scene graph 111 in the example of FIG. 4B is ease of illustration purposes only and is not intended to restrict or limit the contents of scene graph 111 discussed throughout this disclose in more detail.

Figure 5:
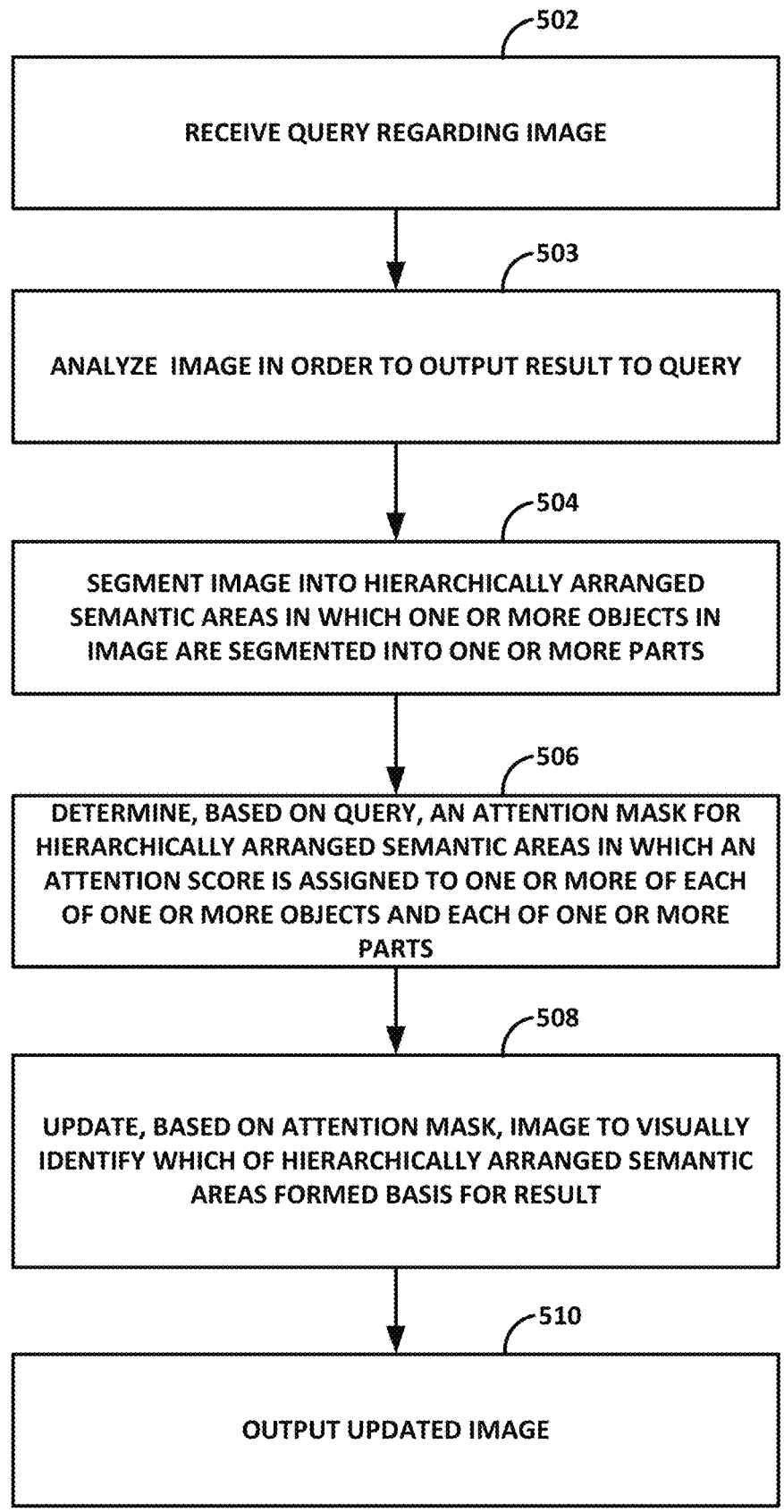
FIG. 5 is a flowchart illustrating example operation of the artificial intelligence engine of the computing device shown in FIG. 1 in performing various aspects of the evaluation techniques described in this disclosure.

FIG. 5 is a flowchart illustrating example operation of the artificial intelligence engine of the computing device shown in FIG. 1 in performing various aspects of the evaluation techniques described in this disclosure. Artificial intelligence (AI) engine 32 may receive a query (represented by audio data 31) regarding an image (represented by image data 33) (502). AI engine 32 may next analyze the image in order to output a result to the query (such as answer 121 shown in the example of FIG. 2) (503). When analyzing the image, AI engine 32 may perform the following operations.

First, AI engine 32 may segment the image into hierarchically arranged semantic areas in which one or more objects in the image are segmented into one or more parts (504). Next, AI engine 32 may determine, based on the query, an attention mask for the hierarchically arranged semantic areas in which an attention score is assigned to one or more of each of the one or more objects and each of the one or more parts (506). AI engine 32 may then update, based on the attention mask, the image to visually identify which of the hierarchically arranged semantic areas formed a basis for the result (508). AI engine 32 may output the updated image 123 (510), which may facilitate understanding of the basis underlying the output result.

In this way, AI engine 32 may, as described above, execute VQA model 20 to perform the above described aspects of the techniques. VQA model 20 may be characterized by the following key properties that enable VQA model 20 to provide operational explainability and transparency. First, VQA model 20 processes visual data, such as images and video, according to several semantically interpretable hierarchical stages in such a manner that inferences made at an earlier state serve as parts and/or components (including recursively identified sub-parts and/or sub-components and so on) for inferences made at a later (or, in other words, higher) stage.

Consider a deep learning-based image processing system (e.g., a CNN) that is trained (or, in other words, built) for image scene type (location) classification at the top stage N, but at the intermediate stages infers scene object classes and object attributes (e.g., at the stage N-1) and parts of the objects at the stage N-2, sub-parts at the stage N-3, etc. In addition, VQA model 20 may be augmented to output segmentation masks for each object or part of interest.

Second, VQA model 20 is trained (or, in other words, built) to perform a useful task in such a manner that each of the inferred concept classes at multiple stages of VQA model 20 receives a trainable attention weight (or, in other words, score). VQA model 20 may assign attention weights to pixels in the visual data (so-called "spatial attention"), to entire objects (so-called "object attention"), and/or other visual concept such as object parts and/or attributes. VQA model 20 may then determine, based on weighted feature vectors representing detected concepts, a result to perform the useful task (e.g., produce the answer responsive to the query).

Third, during performing of the useful task, a user may inspect the hierarchically organized weights (provided by the attention mask) and thereby potentially determine components in the image data that contribute to the decision more than others, be it spatial region in the image, spatio-temporal manifold in a video, some particular objects, groups or object parts and/or sub-parts. By inspecting the evidence for inference in the sequence of inference stages from simple to complex (e.g., from sub-parts to whole objects), the causal flow of influence across the stages of VQA model 20 may be observed because the semantic components and/or concepts associated with the largest weights afford a possibly maximum influence on inference at the next stage. As such, VQA model 20 may enable the user to observe how the component inferences at a lower stage are accumulated to result in a specific inference at a later stage, including the final results of the useful task system.

Figure 6:
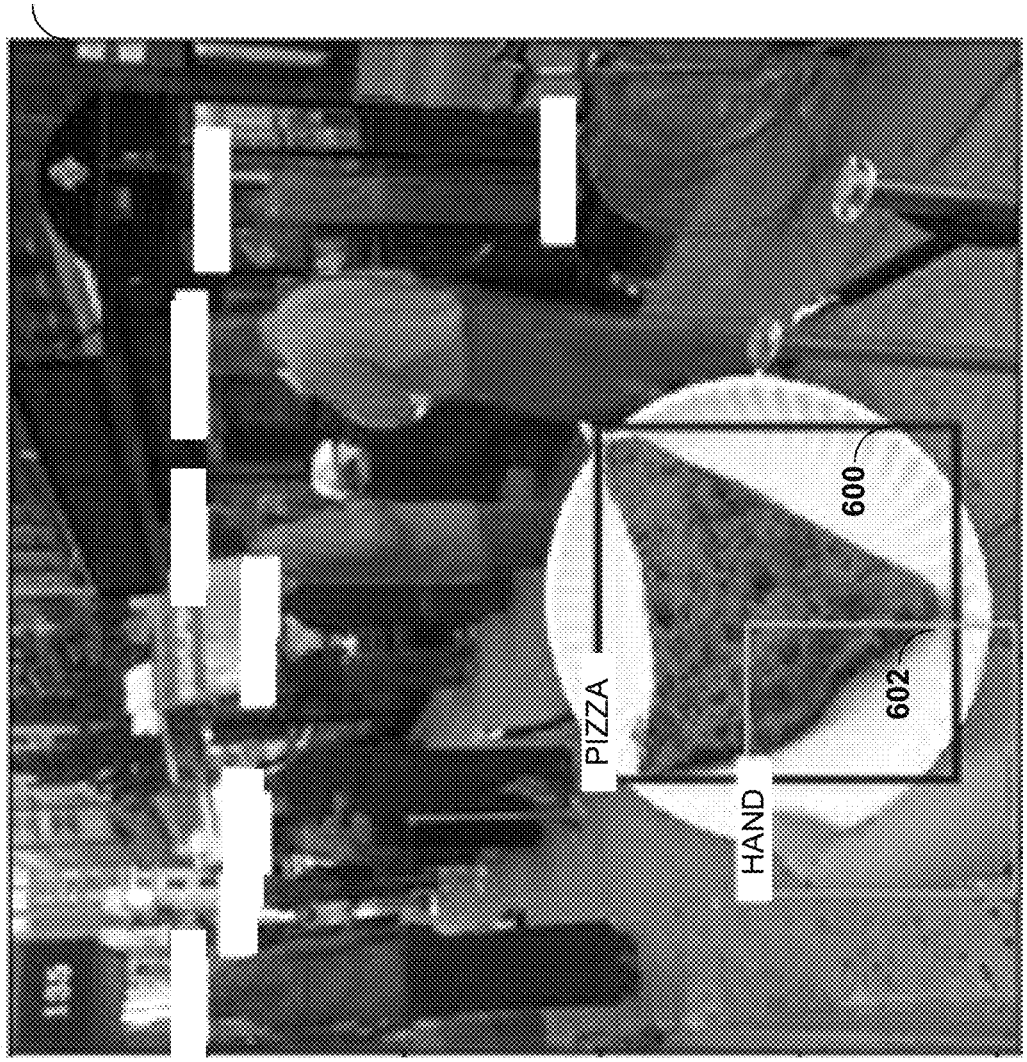
FIG. 6 is a diagram illustrating an example updated image generated by the overlay module shown in the example of FIG. 2 in accordance with various aspects of the techniques described in this disclosure.

FIG. 6 is a diagram illustrating an example updated image generated by the overlay module shown in the example of FIG. 2 in accordance with various aspects of the techniques described in this disclosure. Updated image 123 shows a scene in which a person holds a plate containing a slice of pizza in front of street vendors selling various items on a populated street. Overlay module 120 (shown in the example of FIG. 2) may generate heatmap 600 and overlay heatmap 600 and 602 over image data 23 (which is the underlying image shown in updated image 123).

As shown in the example of FIG. 6, heatmap 600 may correctly identify, with pixel-level granularity the pizza, the slice of pizza, coloring the pizza red (which is a high attention score, where the red is not shown in the grey-scale image), while heatmap 602 identifies the hand, coloring the hand as yellow (which is an intermediate attention score, where the yellow is now shown directly in the grey-scale image). In this example, overlay model 120 generates heat-maps 600 and 602 in a manner that shows the association within scene graph 111 between the hand (identifying the person referenced in the question) and what that person is eating and/or holding (identifying the pizza as being held by or eaten by via the reference edges). Rather than generate an indiscriminate blob that is unfocused or only partially focused on the pizza, overlay module 120 may identify object level heatmaps with pixel-levels of granularity (or, in other words, precision), enabling a user to quickly identify the basis for answer 121 (i.e., "Pizza" in this example).

Figure 7:
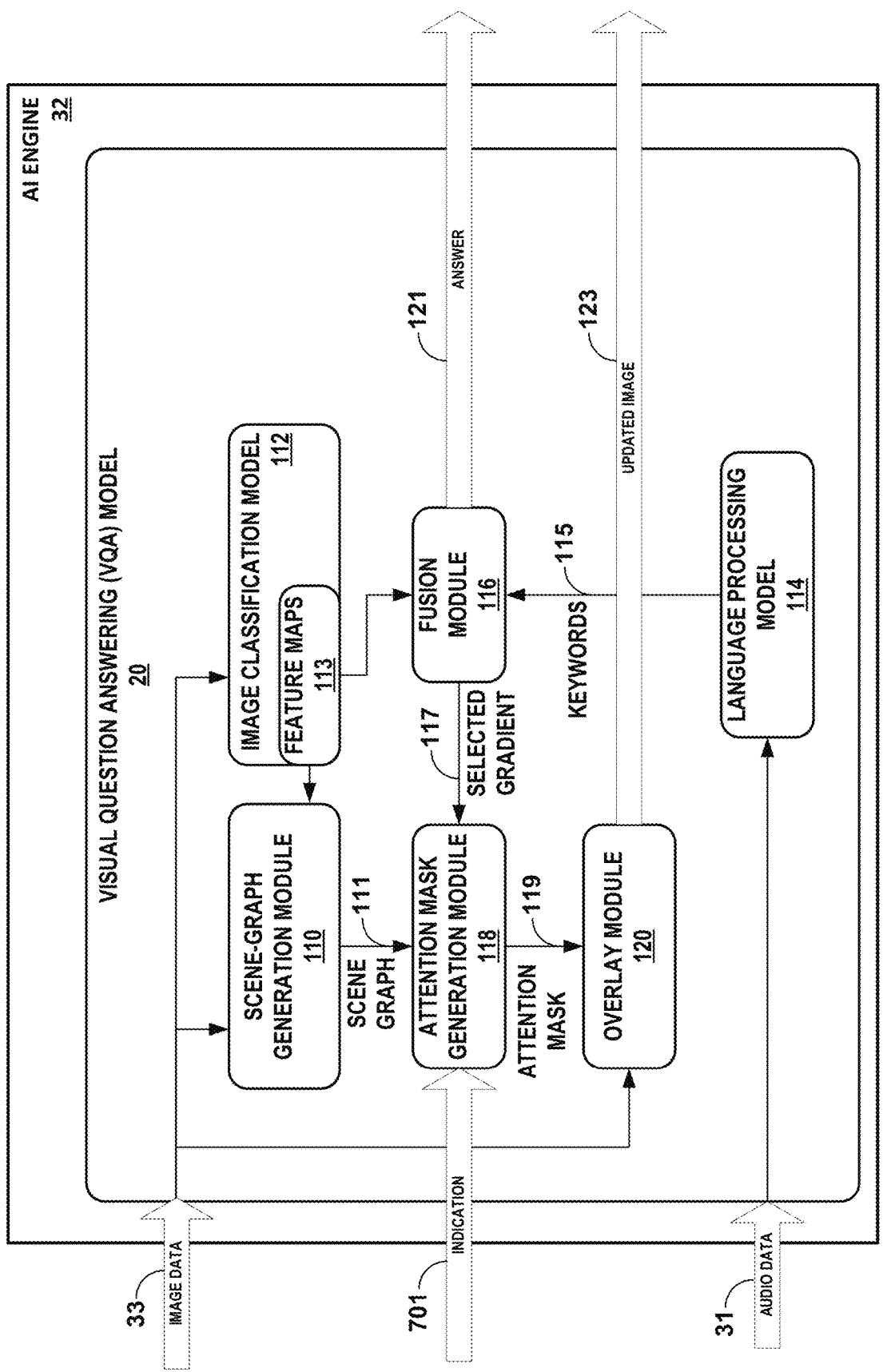
FIG. 7 is a block diagram illustrating another example of the AI engine shown in the example of FIG. 1.

FIG. 7 is a block diagram illustrating another example of the AI engine shown in the example of FIG. 1. In the example of FIG. 7, AI engine 32 is similar to AI engine 32 shown in the example of FIG. 2 except VQA model 20 receiving an indication 701 identifying one of the hierarchically arranged semantic areas. That is, a user or other operator of computing device 12 may interface with computing device 12 via one or more input devices 24 to provide indication 701 identifying one of the hierarchically arranged semantic areas.

VQA model 20 may receive indication 701 and pass indication 701 to attention mask generation module 118. Attention mask generation module 118 may process indication 701 and generate an attention mask 119 based on indication 701. That is, attention mask generation module 118 may modify attention mask 119 to change the attention score for the identified one of the hierarchically arranged areas, thereby enabling the user or other operator to steer or otherwise guide the artificial attention of VQA module 20. Attention mask generation module 118 may thereby update attention mask generation logic responsive to indication 701. The user may iteratively enter indication 701 for one or more images represented by image data 33, where attention mask generation module 118 may thereby iteratively modify and adjust attention masks for the purposes of correcting the VQA model.

The user may enter indication 701 for other purposes as well. In some examples, the user may enter indication 701 as a causal explanatory tool to probe dependence within VQA model 20 on attention allocation patterns given a particular image and a natural language question. As such, attention mask generation module 118 may obtain, from attention mask 119, an attention score for the identified one of the hierarchically arranged semantic areas delineated by the indication 701.

Attention mask generation module 118 may include that attention score in the attention mask 119 provided to overlay unit 120. That is, attention mask generation module 118 may eliminate attention scores from attention mask 119 that do not exceed a threshold (or, alternatively, that are below some threshold) to avoid oversaturating the updated image 123 with too much information. Attention mask generation module 118 may update attention mask 119 to include the attention score for the identified one of the hierarchically arranged areas and potentially remove any other attention scores from attention mask 119 not included within the identified one of the hierarchically arranged areas. Attention mask generation module 119 may continue to provide attention mask 119 to overlay module 120, which may update, based on the attention score for the identified one of the hierarchically arranged semantic areas, the identified one of the hierarchically arranged semantic areas of image data 33 to visually identify an attention of the artificial intelligence model (VQA model 20 in the example of FIG. 7) to the identified one of the hierarchically arranged semantic areas.

The user may enter indication 701 in a number of different ways. The user may interact with the image itself by drawing a box or other indication around one or more objects. Attention mask generation module 118 may present the image with bounding box overlays, whereupon the user may select one of the bounding box overlays to enter indication 701. The bounding boxes may be associated with scene graph nodes, where the user may free-form hand draw an attention mask (using image editing tools provided by the interface presented by computing device 12), entering this user drawn attention mask as indication 701. Attention mask generation module 118 may provide indication 701 to scene-graph generation module 110, which may filter scene graph 111 based on indication 701.

In some examples, the user may be replaced with another neural network or other form of artificial intelligence model that is trained to enter indication 701. That is, an external artificial intelligence model may provide indication 701 in the form of an attention mask via separate analysis of image data 33. Attention mask generation module 118 may then determine, based on indication 701 representative of another attention mask, attention mask 119, either as a combination of the original attention mask determined by attention mask generation module 118 and the additional attention mask or using the additional attention mask in place of the original attention mask.

In this respect, attention mask generation module 118 may modify attention mask 119. In some examples, attention mask generation module 118 may modify attention mask 119 by varying the question leading to particular answers and show how, given the same image and a fixed question, attention mask modification result in different answers. Further, such interactive manipulation of attention may enable users to experiment with the attention mechanism and potentially build intuition about its operation, thereby contributing to formation of the mental system model. In addition, corrective editing of attention masks may enable users to potentially improve model operation.

While the above interactive aspects of the techniques are described above in the context of an image (or, in other words, in the context of the image space), these and other aspects of the techniques may be implemented relative to other spaces, such as an object, parts, attributes, relationships, etc. In this implementation, the user may interface with the scene graph rather than the image to select one or more nodes and/or one or more edges. In this respect, the indication 701 may identify one of the hierarchically arranged areas in terms of the edges and/or nodes of the scene graph, thereby enabling inspection and/or modification of a respective different space attention (e.g., object-based attention, parts-based attention, attribute-based attention).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

What is claimed is:

1. A device configured to explain a result output by an artificial intelligence model configured to analyze an image, the device comprising:
   a memory configured to store the artificial intelligence model and the image; and
   a computation engine executing one or more processors,
   wherein the computation engine is configured to receive a query regarding the image, and
   wherein the computation engine is configured to execute the artificial intelligence model to analyze the image in order to output the result to the query,
   wherein the artificial intelligence model is configured to, when analyzing the image to output the result:
   segment the image into hierarchically arranged semantic areas in which one or more objects in the image are segmented into one or more parts;
   determine, based on the query, an attention mask for the hierarchically arranged semantic areas in which an attention score is assigned to one or more of each of the one or more objects and each of the one or more parts;
   update, based on the attention mask, the image to visually identify which of the hierarchically arranged semantic areas formed a basis for the result output by the artificial intelligence model; and
   output the updated image.

2. The device of claim 1, wherein the artificial intelligence model is configured to:
   identify the one or more objects at a pixel-level of granularity;
   segment the one or more objects into one or more parts at the pixel-level of granularity; and
   determine the attention masks for the hierarchically arranged semantic areas at a pixel-level of granularity.

3. The device of claim 1, wherein the artificial intelligence model is configured to recursively segment the image into the hierarchically arranged semantic areas.

4. The device of claim 1, wherein the artificial intelligence model is configured to:
   generate, based on the attention mask, a heatmap that uses color to visually identify which of the hierarchically arranged semantic areas formed a basis for the result output by the artificial intelligence model; and
   overlay the heatmap over the image to obtain the updated image.

5. The device of claim 1,
wherein the artificial intelligence model includes a neural network configured to perform semantic parsing of the query to identify a meaning of the query, and
wherein the artificial intelligence model is further configured to analyze, based on the meaning, the hierarchically arranged semantic areas to obtain the result to the query.

6. The device of claim 1, wherein the artificial intelligence model comprises a neural network configured to segment the image into the hierarchically arranged semantic areas.

7. The device of claim 1, wherein the artificial intelligence model is configured to:
identify the one or more objects, the one or more parts, relationships between the one or more objects and the one or more parts, attributes associated with the one or more objects, and one or more scenes present in the image; and
generate a scene graph representing the one or more scenes as a hierarchical arrangement in which the one or more objects are associated with the corresponding one or more parts according to the relationships between the one or more objects and the one or more parts in which the one or more objects are associated with the corresponding attributes and one or more objects are associated with one more scenes.

8. The device of claim 1,
wherein the artificial intelligence model is further configured to:
receive an indication identifying one of the hierarchically arranged semantic areas; and
obtain, based on the attention mask, the attention score for the identified one of the hierarchically arranged semantic areas, and
wherein the artificial intelligence model is configured to update, based on the attention score for the identified one of the hierarchically arranged semantic areas, the identified one of the hierarchically arranged semantic areas of the image to visually identify an attention of the artificial intelligence model to the identified one of the hierarchically arranged semantic areas.

9. The device of claim 1, wherein the artificial intelligence model is further configured to:
receive an indication identifying one of the hierarchically arranged semantic areas; and
modify the attention mask to change the attention score for the identified one of the hierarchically arranged areas.

10. A method of explaining a result output by an artificial intelligence model configured to analyze an image, the method comprising:
receiving, by a computing device, a query regarding the image; and
executing, by the computing device, the artificial intelligence model to analyze the image in order to output the result to the query,
wherein analyzing, by the artificial intelligence model, the image to output the result further comprises:
segmenting, by the computing device, the image into hierarchically arranged semantic areas in which one or more objects in the image are segmented into one or more parts;
determining, based on the query and by the computing device, an attention mask for the hierarchically arranged semantic areas in which an attention score is assigned to one or more of each of the one or more objects and each of the one or more parts;
updating, based on the attention mask and by the computing device, the image to visually identify which of the hierarchically arranged semantic areas formed a basis for the result output by the artificial intelligence model; and
outputting, by the computing device, the updated image.

11. The method of claim 10, wherein segmenting the image comprises:
identifying the one or more objects at a pixel-level of granularity;
segmenting the one or more objects into one or more parts at the pixel-level of granularity; and
determining the attention masks for the hierarchically arranged semantic areas at a pixel-level of granularity.

12. The method of claim 10, wherein segmenting the image comprises recursively segment the image into the hierarchically arranged semantic areas.

13. The method of claim 10, further comprising:
generating, based on the attention mask, a heatmap that uses color to visually identify which of the hierarchically arranged semantic areas formed a basis for the result output by the artificial intelligence model; and
overlaying the heatmap over the image to obtain the updated image.

14. The method of claim 10,
wherein the artificial intelligence model includes a long short-term memory network configured to perform semantic parsing of the query to identify a meaning of the query, and
wherein the method further comprises analyzing, based on the meaning, the hierarchically arranged semantic areas to obtain the result to the query.

15. The method of claim 10, wherein the artificial intelligence model comprises a neural network configured to segment the image into the hierarchically arranged semantic areas.

16. The method of claim 10, wherein segmenting the image comprises:
identifying the one or more objects, the one or more parts, relationships between the one or more objects and the one or more parts, attributes associated with the one or more objects, and one or more scenes present in the image; and
generating a scene graph representing the one or more scenes as a hierarchical arrangement in which the one or more objects are associated with the corresponding one or more parts according to the relationships between the one or more objects and the one or more parts in which the one or more objects are associated with the corresponding attributes.

17. The method of claim 10, wherein segmenting the image comprises segmenting the image into hierarchically arranged semantic areas in which the one or more objects in the image are segmented into the one or more parts, and the one or more parts are segmented into one or more sub-parts.

18. The method of claim 10, further comprising:
receiving an indication identifying one of the hierarchically arranged semantic areas; and
obtaining, based on the attention mask, an attention score for the identified one of the hierarchically arranged semantic areas,
wherein updating the image comprises updating, based on the attention score for the identified one of the hierarchically arranged semantic areas, the identified one of the hierarchically arranged semantic areas of the image to visually identify an attention of the artificial intelligence model to the identified one of the hierarchically arranged semantic areas.

19. The method of claim 10, further comprising:

receiving an indication identifying one of the hierarchically arranged semantic areas; and modifying the attention mask to change the attention score for the identified one of the hierarchically arranged areas.

20. A non-transitory computer-readable storage medium having stored thereon instructions that, when executed, cause one or more processors to:

receive a query regarding an image;

segment the image into hierarchically arranged semantic areas in which one or more objects in the image are segmented into one or more parts;

determine, based on the query, an attention mask for the hierarchically arranged semantic areas in which an attention score is assigned to one or more of each of the one or more objects and each of the one or more parts;

update, based on the attention mask, the image to visually identify which of the hierarchically arranged semantic areas formed a basis for the result output by the artificial intelligence model; and output the updated image.

* * * * *